United States Patent Office 3,729,528
Patented Apr. 24, 1973

3,729,528
PROCESS FOR THE PREPARATION OF POLYESTER RESINS WITH LOW SHRINKAGE FROM POLYESTER RESINOUS COMPOSITIONS CONTAINING A REACTIVE FILLER
Gerhard Werner, Hofheim, Taunus, Dieter Stahl, Kriftel, Taunus, and Guido Max Rudolf Lorentz, Frankfurt am Main, Germany, assignors to Farbwerke Hoechst Aktiengesellschaft vormals Meister Lucius & Bruning, Frankfurt am Main, Germany
No Drawing. Filed Apr. 21, 1971, Ser. No. 136,216
Claims priority, application Germany, Apr. 23, 1970,
P 20 19 673.0
Int. Cl. C08f 43/08
U.S. Cl. 260—862                                         4 Claims

ABSTRACT OF THE DISCLOSURE

Unsaturated polyester resins are hardened in the presence of a reactive filler which is a cotelomer of a vinyl aromatic compound, especially styrene, and maleic anhydride. As compared with the resin containing no reactive filler the shrinkage on hardening is reduced. Telomer styrene which was used before as the reactive filler causes an increase in the viscosity of the resins which is considerably higher than the increase caused by the cotelomers herein described.

---

The present invention relates to a process for the manufacture of hardened unsaturated polyester resins having a low tendency to shrink.

In general usage, the term "unsaturated polyester resins (UP resins)" includes solutions of esters of maleic acid or fumaric acid, or of other unsaturated acids, with mono- or polyhydric alcohols in polymerizable hydrocarbons, such as styrene or methylstyrene, or in polymerizable esters such as acrylic- or methacrylic acid esters.

As is well-known, UP resins shrink on hardening, which proceeds according to a polymerization mechanism in the presence of free radicals. Moreover, it takes a relatively long time, approximately three days, before UP resins are free from tackiness after hardening.

Attempts have been made to overcome the tendency of UP resins to shrink by adding large amounts of fillers which, however, produces stresses under which the resins may lose, for example, their adhesion to ceramic tiles, or under which the tile coverings bulge.

It has, furthermore, been attempted to diminish the shrinking of UP resins by adding polystyrene. However, owing to this addition the viscosity of the UP resin solutions increases to such an extent that, when used in conjunction with fillers, they can hardly be worked any longer.

Now we have found that UP resins, on hardening, shrink to a substantially lesser extent and harden in a considerably shorter time without being tacky when they are hardened in conjunction with a cotelomer obtained from maleic anhydride and a vinyl-aromatic compound, which contains maleic anhydride and the vinyl-aromatic compound in a molar ratio of 1:20 to 1:2, preferably 1:10 to 1:6, and has an average molecular weight within the range of from 600 to 3000.

Styrene is the preferred vinyl-aromatic compound in the cotelomer used in accordance with the invention, however, vinyl toluene or, for example, α-methylstyrene may also be used.

The cotelomers used according to the invention are known per se and are obtained, for example, by the process described in Belgian Pat. 664,698 and U.S. Pat. No. 3,558,570 by copolymerizing maleic anhydride with styrene at temperatures above 150° C.

The table following hereunder shows, by way of comparison, the viscosities of a pure polyester resin, of different mixtures comprising the additive of the invention and of mixtures comprising the conventional aditives polystyrene and telomer polystyrene. It clearly results from the table that with the use of the additive of the invention the increase of the viscosity is substantially lower.

TABLE I
(SMA=styrene/maleic anhydride in the indicated molar ratio. 100 parts by weight of polyester resin, 8.25 parts by weight of the additive)

| Polyester resin | 100 | 100 | 100 | 100 | 100 | 100 | 100 |
|---|---|---|---|---|---|---|---|
| Telomer SMA: | | | | | | | |
| 10:1 | | 8.25 | | | | | |
| 8:1 | | | 8.25 | | | | |
| 6:1 | | | | 8.25 | | | |
| 2:1 | | | | | 8.25 | | |
| Telomer polystyrene | | | | | | 8.25 | |
| Polystyrene | | | | | | | 8.25 |
| Viscosity in cp | 609 | 1,206 | 1,287 | 975 | 1,023 | 2,151 | 2,562 |

UP resins are usually processed in conjunction with solid fillers. As fillers there are primarily used quartz powder, but also—depending on the mechanical or chemical requirements—carbon— or graphite powder, barite and other fillers. It has proved useful to mix the additive of the invention with the filler and to add this mixture to the UP resin. When the cotelomer is added to the UP resin, the further mixing with fillers is rendered somewhat more difficult because the viscosity of the resin increases.

The values for compressive strength, tensile strength and bending strength indicated in the examples following hereunder were measured on cylinders having a height of 25 mm. and a diameter of 25 mm.

The shrinkage was determined by means of a so-called shrinkage beam. For this purpose, eight ceramic tiles dimensioned 25 x 11.5 x 2.5 cm. and having dove-tailed grooves on one side were laid in a 10 mm. thick bed of the cement indicated in each case (width of the joints: 10 mm.).

The joints were filled with the same cement in a manner such that it was free from cavities. This shrinkage beam was stored at a temperature of 22° C.±2° C. The bulge in the middle of the beam was measured after a period of 30 days.

The following examples illustrate the invention, the parts and ratios being by weight:

EXAMPLE 1

(1) UP-resin solution

The resin was obtained by heating 300 parts of polyethylene terephthalate with 684 parts of maleic dibutyl ester and 312 parts of dimethyl propanediol.

The solution contained 56 parts of the resin
44 parts of styrene
0.1 part of dimethyl aniline } co-catalysts
0.1 part of diethyl aniline (2) Filler The filler consisted of 65 parts of arenaceous sand (grain size 0.1 to 0.3 mm.)
28 parts of quartz powder
4 parts of kieselweiβ
0.3 part of titanium dioxide
1.2 parts of benzoyl peroxide of 20% strength as hardener
1.5 parts of a cotelomer from 8 moles of styrene and 1 mole of maleic anhydride (molecular weight 2000)
1 part of asbestos fibers.

The resin solution and the filler were mixed in a mixer in a ratio of 1:5.5.

The following mechanical values were measured after a hardening time of 14 days at 22° C.:

(I)

| | Kg./cm.² |
|---|---|
| Compressive strength | 900 |
| Bending strength | 300 |
| Tensile strength | 70 |

(II)

| | Mm. |
|---|---|
| Bulge of the shrinkage beam cement according to the example | 2 |
| Control without cotelomer | 8 |

(III)

Adhesion to ceramic tiles 15 x 15 x 1.2 cm.

| | 14 days at 22° C. | 14 days at 22° C. plus 24 hours at 60° C. |
|---|---|---|
| Cement according to the example, kg./cm.² | 19.2 | 6 |
| Control without cotelomer, kg./cm.² | 6.6 | 0 |

EXAMPLE 2

The UP-resin was prepared from 0.4 mole of phthalic acid, 0.6 mole of maleic acid, 0.8 mole of diethylene glycol and 0.2 mole of triethylene glycol. The resin solution consisted of 70 parts of resin and 30 parts of styrene.

The filler was the same as that used in Example 1. The resin solution and the filler were mixed in a ratio of 1:5.5, the same as in Example 1.

I

| | Compressive strength, kg./cm.² | Bending strength, kg./cm.² | Tensile strength, kg./cm.² |
|---|---|---|---|
| Cement according to the example | 840 | 309 | 150 |
| Control without cotelomer | 970 | 366 | 140 |

II.—ADHESION TO CERAMIC TILES

| | a | b | c | d |
|---|---|---|---|---|
| Cement according to the example | 34 | 51 | 50 | 50 |
| Control without cotelomer | 30 | 36 | 28 | 38 | a = 14 days at 22° C.
b = the same as a plus 200 hours at 60° C.
c = the same as a plus 200 hours at 90° C.
d = the same as a plus 200 hours at 120° C. values in kg./cm.².

III.—BULGE OF THE SHRINKAGE BEAM

| | |
|---|---|
| Cement according to the example, mm | 0.7 |
| Control without cotelomer, mm | 4.5 |

With the use of a cement comprising the additive according to the invention, the surface of a layer applied by trowelling was free from tackiness after 24 hours, whereas without such an additive, the surface was free from tackiness only after 72 hours.

Table II following hereunder illustrates the action of several styrene/maleic anhydride telomers on the shrinkage of polyester resins.

| Parts of resin according to Example 2 | 100 | 100 | 100 | 100 | 100 | 100 |
|---|---|---|---|---|---|---|
| Parts of telomer: | | | | | | |
| SMA 8:1 | 8.25 | | | | | |
| SMA 10:1 | | 8.25 | | | | |
| SMA 6:1 | | | 8.25 | | | |
| SMA 2:1 | | | | 8.25 | | |
| Polystyrene telomer | | | | | 8.25 | |
| Shrinkage [1] | 4.35 | 0.6 | 0.7 | 2.95 | 2.8 | 0.3 |

[1] I.e. deflection of the beams in mm. after 30 days (22° C.).

We claim:

1. In a process for the preparation of hardened unsaturated polyester resins from polyester resin compositions comprising a mixture of at least one unsaturated polyester which comprises the condensation reaction product of ethylenically unsaturated dicarboxylic acids and polyhydric alcohols, inert filler, reactive filler, and unsaturated monomer, the improvement which comprises using as said reactive filler a cotelomer of maleic anhydride and a vinyl aromatic compound selected from the group consisting of vinyl benzene and alkyl substituted vinyl benzenes in a molar ratio of 1:20 to 1:2, said cotelomer having an average molecular weight of 600 to 3000, to reduce the tendency of the polyester resin composition to shrink during hardening.

2. A process as claimed in claim 1 in which the vinyl-aromatic compound in the cotelomer is styrene.

3. A composition adapted to be added to an unsaturated polyester resin, said polyester comprising the condensation reaction product of ethylenically unsaturated dicarboxylic acids and polyhydric alcohols to harden the resin while reducing the tendency of the resin to shrink during hardening, said composition consisting essentially of at least one inert filler, a hardener for the unsaturated polyester resin and a reactive filler, said reactive filler being a cotelomer of maleic anhydride and a vinyl aromatic compound selected from the group consisting of vinyl benzene and alkyl substituted vinyl benzenes in a molar ratio of 1:20 to 1:2 with an average molecular weight of 600 to 3000.

4. A composition as claimed in claim 3, in which the vinyl-aromatic compound in the cotelomer is styrene.

References Cited
UNITED STATES PATENTS
3,207,816   9/1965   Dugliss et al. _____ 260—861

HAROLD D. ANDERSON, Primary Examiner
E. WOODBERRY, Assistant Examiner

U.S. Cl. X.R.
260—40, 78.5, 861